(12) United States Patent
Ellison et al.

(10) Patent No.: US 11,671,826 B2
(45) Date of Patent: *Jun. 6, 2023

(54) VOICE CONTROL AND TELECOMMUNICATIONS SERVICE INTEGRATION

(71) Applicant: T-Mobile, USA, Inc., Bellevue, WA (US)

(72) Inventors: James Ellison, Issaquah, WA (US); Joel Werdell, Seattle, WA (US); Robert Stamm, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 80 days.

This patent is subject to a terminal disclaimer.

(21) Appl. No.: 16/932,534

(22) Filed: Jul. 17, 2020

(65) Prior Publication Data

US 2020/0351659 A1 Nov. 5, 2020

Related U.S. Application Data

(63) Continuation of application No. 15/645,458, filed on Jul. 10, 2017, now Pat. No. 10,771,969.

(Continued)

(51) Int. Cl.
*H04W 12/06* (2021.01)
*G06F 21/32* (2013.01)
(Continued)

(52) U.S. Cl.
CPC ........... *H04W 12/06* (2013.01); *G06F 21/32* (2013.01); *G10L 15/22* (2013.01); *G10L 17/22* (2013.01);
(Continued)

(58) Field of Classification Search
CPC ....... H04W 12/06; H04W 12/63; G06F 21/32; G10L 15/22; G10L 17/22;
(Continued)

(56) References Cited

U.S. PATENT DOCUMENTS 9,147,054 B1 9/2015 Beal et al.
9,548,979 B1 * 1/2017 Johnson .................. G10L 15/22
(Continued)

FOREIGN PATENT DOCUMENTS

WO 2018049047 A1 3/2018

OTHER PUBLICATIONS

International Application No. PCT/US2017/050508, International Search Report and Written Opinion dated Dec. 14, 2017, 14 pages.
(Continued)

*Primary Examiner* — Catherine Thiaw
(74) *Attorney, Agent, or Firm* — Han Santos, PLLC

(57) ABSTRACT

This disclosure describes techniques that facilitate selectively interacting with a computing resource based on receipt of an incoming voice command. Particularly, a voice control integration system may parse content of an incoming voice command to authenticate an identity of the client, and further determine an intended meaning of the incoming voice command. In doing so, the voice control integration system may interact with a computing resource to perform an action that fulfills a client request. Computing resources may be associated with service providers or client devices of a client. Further, the voice control integration system may authenticate a client identity based on a one or two-factor authentication protocol, of which one may correspond to a biometric analysis of the incoming voice command. Further, a second-factor of the two-factor authentication protocol (Continued)

may be implemented via a voice interaction device, another client device accessible to the client, or a combination of both.

18 Claims, 11 Drawing Sheets

Related U.S. Application Data

(60) Provisional application No. 62/360,845, filed on Jul. 11, 2016.

(51) Int. Cl.
  *G10L 15/22* (2006.01)
  *G10L 17/22* (2013.01)
  *H04L 9/40* (2022.01)
  *H04W 12/63* (2021.01)

(52) U.S. Cl.
  CPC ........ *H04L 63/083* (2013.01); *H04L 63/0861* (2013.01); *G10L 2015/223* (2013.01); *H04L 63/0853* (2013.01); *H04L 63/102* (2013.01); *H04W 12/63* (2021.01)

(58) Field of Classification Search
  CPC ............. G10L 2015/223; H04L 63/083; H04L 63/0861; H04L 63/0853; H04L 63/102
  See application file for complete search history.

(56) References Cited

U.S. PATENT DOCUMENTS

| | | | |
|---|---|---|---|
| 9,977,881 | B2 | 5/2018 | Mathew |
| 2004/0111369 | A1 | 6/2004 | Lane et al. |
| 2006/0002556 | A1 | 1/2006 | Paul |
| 2006/0190991 | A1 | 8/2006 | Iyer |
| 2008/0037500 | A1 | 2/2008 | Andrus et al. |
| 2011/0066985 | A1 | 3/2011 | Corbin et al. |
| 2011/0275348 | A1 | 11/2011 | Clark et al. |
| 2013/0046984 | A1 | 2/2013 | Lucidarme et al. |
| 2014/0201335 | A1 | 7/2014 | Wang |
| 2014/0274008 | A1 | 9/2014 | Olodort |
| 2014/0297528 | A1 | 10/2014 | Agrawal et al. |
| 2014/0310416 | A1 | 10/2014 | Durbha et al. |
| 2015/0058447 | A1 | 2/2015 | Albisu |
| 2015/0095986 | A1 | 4/2015 | Karpey et al. |
| 2016/0119377 | A1 | 4/2016 | Goldberg et al. |
| 2016/0189717 | A1 | 6/2016 | Kannan et al. |
| 2017/0031576 | A1 | 2/2017 | Saoji et al. |
| 2017/0133011 | A1 | 5/2017 | Chen et al. |
| 2017/0201524 | A1 | 7/2017 | Dureau |
| 2017/0255446 | A1 | 9/2017 | Malatesha et al. |
| 2017/0358317 | A1 | 12/2017 | James |
| 2017/0359334 | A1 | 12/2017 | Maddox et al. |
| 2018/0007060 | A1 | 1/2018 | Leblang et al. |
| 2018/0014189 | A1 | 1/2018 | Ellison et al. |
| 2018/0077573 | A1 | 3/2018 | Werdell et al. |
| 2018/0218137 | A1 | 8/2018 | Park |

OTHER PUBLICATIONS

U.S. Appl. No. 15/645,458, Final Office Action dated Aug. 1, 2019, 32 pages.
U.S. Appl. No. 15/645,458, Final Office Action dated Mar. 18, 2020, 24 pages.
U.S. Appl. No. 15/645,458, Non Final Office Action dated Dec. 12, 2019, 33 pages.
U.S. Appl. No. 15/645,458, Non Final Office Action dated Jan. 24, 2019, 42 pages.
U.S. Appl. No. 15/645,458, Notice of Allowance dated May 7, 2020, 18 pages.
U.S. Appl. No. 15/697,385, Corrected Notice of Allowability dated Jan. 2, 2020, 7 pages.
U.S. Appl. No. 15/697,385, Notice of Allowance dated Aug. 8, 2019, 28 pages.
U.S. Appl. No. 15/967,385, Non Final Office Action dated Feb. 4, 2019, 32 pages.

* cited by examiner

VOICE CONTROL AND TELECOMMUNICATIONS SERVICE INTEGRATION

RELATED APPLICATIONS

This application is a continuation of U.S. application Ser. No. 15/645,458, filed Jul. 10, 2017 and titled "Voice Control and Telecommunications Service Integration," which claims the benefit of U.S. Provisional Patent Application No. 62/360,845, filed on Jul. 11, 2016, and titled "Voice Control and Telecommunication Service Integration," which are herein incorporated by reference in their entirety.

BACKGROUND

Mobile telecommunications devices have evolved into highly-capable computational platforms that offer features and functionality that extend beyond wireless voice communications. At present, consumers rely greatly upon accessing an increasingly diverse and growing number of services and capabilities via client devices, such as mobile telecommunications devices. In some instances, consumers may access dedicated software applications, remote servers or client devices, to access information on the Internet or send commands to Internet-based or local machine services. However, in a home or office setting, consumers may have their extremities occupied and may not be able to access navigate through the user interfaces of such applications and devices through physical input.

Further, service providers may develop and refine individual user interfaces of software applications or services for the purpose of providing consumers with a seamless computing experience. That said, a growing source of limitation and frustration for consumers is the sheer diversity and growing number of customized user interfaces that consumers are required to learn, adapt, and navigate through in order to appreciate the services and capabilities of their computational platforms.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
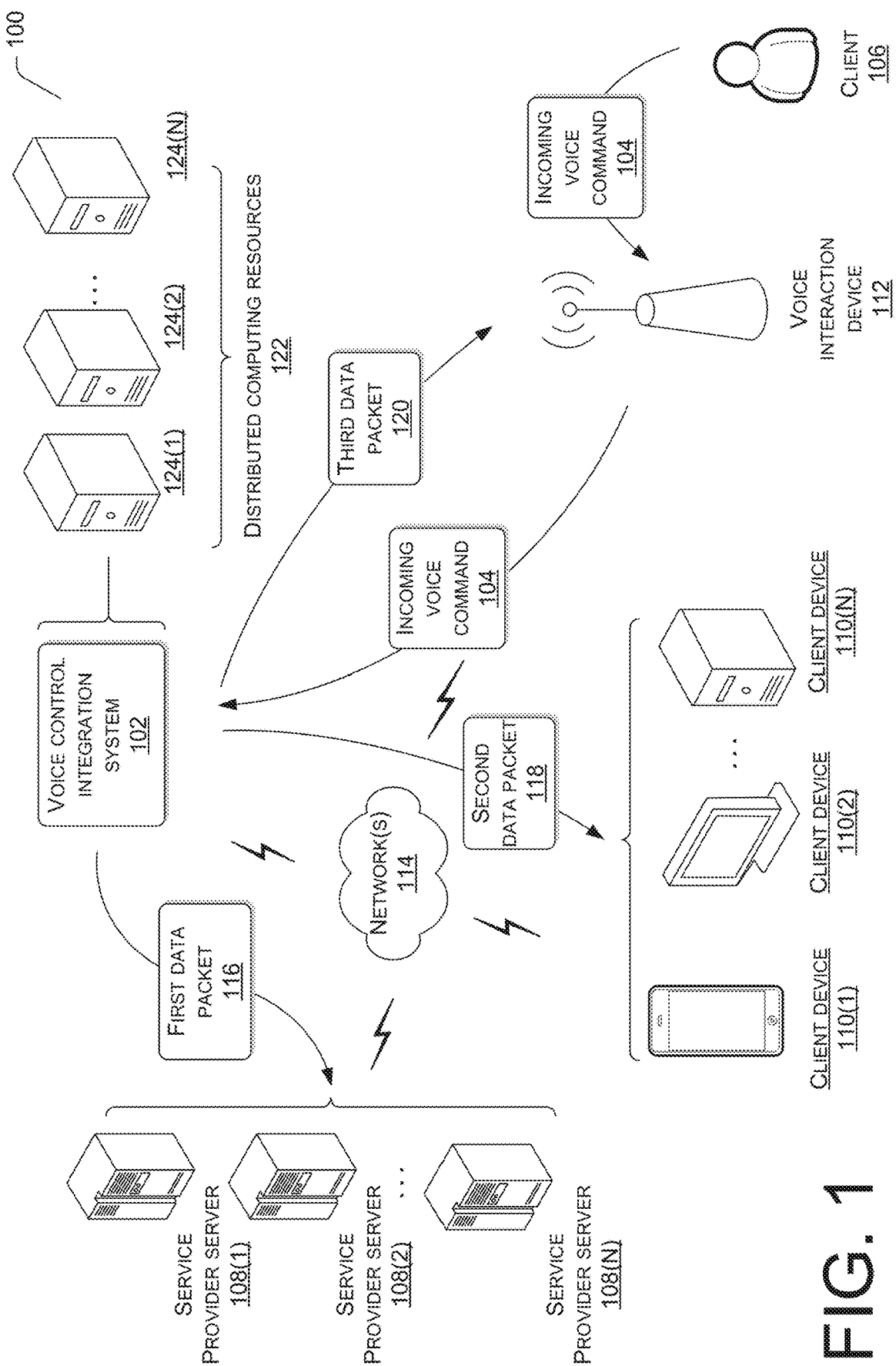
FIG. 1 illustrates a schematic view of a computing environment that facilitates an operation of a voice control integration system.

This disclosure describes techniques that facilitate selectively interacting with a computing resource based at least in part on receipt of a voice-initiated command. Particularly, a voice control integration system is described that provides a client with a means for accessing multiple services and computational capabilities. Typically, each service and computational capability may be associated with a computing resource. The voice control integration system may be configured to automate and streamline access to each of the computing resources, thus foregoing an extensive client interaction that is typically associated with gaining access to a computing resource. By automating and streamlining access to such computing resources, the voice control integration system may reduce an overall volume of communications between a client device and the underlying computing resource, which in turn may translate into a network bandwidth efficiency for the underlying computing resource, an improved quality of user experience, an improved quality of service experience, or any combination thereof.

In various examples, the voice control integration system may establish a communicative connection with a computing resource of a service provider or a client device associated with a client. In doing so, the voice control integration system may perform one or more actions associated with a service of a service provider, or a computational capability of the client device. In a non-limiting example, the computing resource may correspond to a server of a service provider, such as a telecommunications service provider. In other examples, the computing resource may correspond to a client device that is associated with the client, such as an entertainment system, a television system, a thermostat, or any client device that may be communicatively coupled to the voice control integration system via one or more communication networks.

Moreover, the voice control integration system may receive an incoming voice command via a voice interaction device that is communicatively coupled to the voice control integration system. The voice interaction device may include a speaker component and a microphone component that selectively transmits and receives audible communications to and from a client. The voice interaction device may further include one or more network interfaces that facilitate a communicative coupling with the voice control integration system, and in some instances, computing resources associated with a service provider or computing resources associated with a client. In some examples, the voice interaction device may be an integrated component of a client device, or a client device that is located within a predetermined proximity of the client. The proximity of the voice interaction device to the client is based at least in part on an ability of the voice interaction device to capture an incoming voice command from the client.

In a non-limiting example, the voice control integration system may receive an incoming voice command that relates to an operation of a client device subscribed to a telecommunications service of a telecommunications service provider. In this example, a client may enunciate a voice command that requests a change to a product setting of a client device. The voice control integration system may parse content of the incoming voice command to authenticate an identity of the client, and further determine an intended meaning of the incoming voice command. In some examples, the voice control integration system may parse content of the incoming voice command via at least one of a natural language processing algorithm or a natural language understanding algorithm to determine an intended meaning. In response to doing so, the voice control integration system may interact with a computing resource of the telecommunications service provider to perform at least one action that fulfills the client request.

Moreover, the voice control integration system may be configured to authenticate a client identity based on a single-factor authentication protocol, or alternatively a two-factor authentication protocol. The single-factor authentication protocol may correspond to an initial biometric analysis of the incoming voice command. Alternatively, the single factor authentication protocol may correspond to a request for a client to audibly respond to a phrase or question transmitted by a voice interaction device. A selection between a single-factor or two-factor authentication protocol may be based on assignment by one of a service provider or client, whomever has ownership or control of the underlying computing resource.

Additionally, the voice control integration system may include a data store that records a selection of a single-factor or two-factor authentication protocol for each computing resource. In some examples, the data store may include an indication of a single-factor or two-factor authentication protocol for all actions associated with a particular computing resource. In other examples, the data store may include an additional level of granularity by indicating that a two-factor authentication protocol is associated to a portion of, but not all, client interactions with a computing resource. For example, the data store may include an indication that assigns a two-factor authentication protocol for particular interactions that involve client sensitive or service provider sensitive data, such as financial distributions, adjustments to account settings, or adjustments to product settings. In this example, a single-factor authentication protocol may be assigned to all other client interactions with that particular computing resource.

In some examples, a two-factor authentication protocol may be implemented via the voice interaction device, another client device that is accessible to the client, or a combination of both. For example, the two-factor authentication protocol may request that a client audibly respond to a phrase or question that is delivered by the voice interaction device. Alternatively, the two-factor authentication protocol may involve the voice interaction device delivering a request for the client to respond to a question associated with multimedia content presented on another client device.

The techniques described herein may be implemented in a number of contexts. Several example implementations and context are provided with reference to the following figures. Further, the term "techniques," as used herein, may refer to system(s), method(s), computer-readable instruction(s), module(s)m algorithms, hardware logic, and/or operation(s) as permitted by the context described above and throughout the document.

FIG. 1 illustrates a schematic view of a computing environment 100 that facilitates an operation of a voice control integration system 102. In various examples, the voice control integration system 102 may facilitate selectively interacting with a computing resource, based on incoming voice command 104 of a client 106. Particularly, the voice control integration system 102 may parse content of an incoming voice command 104 to authenticate an identity of the client, and further determine an intended meaning of the incoming voice command 104. In doing so, the voice control integration system 102 may interact with a computing resource to perform an action that fulfills a request associated with the incoming voice command 104. In some examples, the computing resources may correspond to one or more server(s) 108(1)-108(N) of a service provider, or one or more client device(s) 110(1)-110(N) associated with a client.

In the illustrated example, the client 106 may vocalize an incoming voice command 104 towards a voice interaction device 112. The incoming voice command 104 may relate to a service of a service provider, or a computational capability of one or more client device(s) 110(1)-110(N) associated with a client 106. Particularly, the incoming voice command 104 may relate to adjusting a parameter of a service associated with a service provider. In a non-limiting example, the service provider may correspond to a telecommunications service provider. In this instance, the parameter of the service provider may correspond to one of an account setting, a product setting, or a service setting. Similarly, the incoming voice command 104 may relate to adjusting a parameter of a client device 110 associated with the client 106. The client device 110 may correspond to one of an entertainment system, a television system, a thermostat, or any client device that may be communicatively coupled to the voice control integration system via one or more communication networks. In this instance, the parameter of the client device 110 may correspond to activating the client device 110 or adjusting a setting of the client device 110.

Further, the voice interaction device 112 may selectively receive and transmit audible communications to and from a client. Particularly, the voice interaction device 112 may be communicatively coupled to the voice control integration system 102 via one or more network(s) 114.

In some examples, the voice control integration system 102 may parse content of the incoming voice command to authenticate an identity of the client, identify a server or a client device that is associated with the incoming voice command 104, and determine an intended meaning of the incoming voice command. Further, the voice control integration system 102 may generate computer executable instructions that automate performance of an action that fulfills a request associated with the incoming voice command 104. In some examples, the voice control integration system 102 may transmit a first data packet 116 to a server 108 associated with a service provider, or a second data packet 118 to a client device 110 associated with the client 106. The first data packet 116 and the second data packet 118 may include computer executable instructions that automate performance of the action that on the server 108 or client device 110 respectively, whereby the action fulfills a request associated with the incoming voice command. Upon doing so, the voice control integration system 102 may further transmit a third data packet 120 to the voice interaction device 112. The third data packet 120 may include a message that is to be audibly output by the voice interaction device 112, the message relating to performance of an action relating to incoming voice command 104.

In some examples, the voice control integration system 102 may authenticate a client identity based on a single-factor or a two-factor authentication protocol. The single-factor authentication protocol may be based on a voice biometric analysis of the incoming voice command 104. Further, a second-factor of a two factor authentication protocol may involve transmitting data to a client device 110 of the client 106, along with a message to the client 106 via the voice interaction device 112. The data transmitted to the client device 110 may include multimedia content that is to be presented on a user interface of the client device 110. Further, the message transmitted to the client 106 may include a request for the client 106 to respond to a question associated with the presentation of the multimedia content on the client device 110

In the illustrated example, the voice control integration system 102 may operate on one or more distributed computing resource(s) 122. The one or more distributed computing resource(s) 122 may include one or more computing device(s) 124(1)-124(N) that operate in a cluster or other configuration to share resources, balance load, increase performance, provide fail-over support or redundancy, or for other purposes. The one or more computing device(s) 124(1)-124(N) may include one or more interfaces to enable communications with other networked devices, such as the client device(s) 110(1)-110(N), via one or more network(s) 114. Further, the one or more network(s) 114 may include public networks such as the Internet, private networks such as an institutional and/or personal intranet, or some combination of private and public networks. The one or more network(s) 114 can also include any type of wired and/or wireless network, including but not limited to local area network (LANs), wide area networks (WANs), satellite networks, cable networks, Wi-Fi networks, Wi-Max networks, mobile communications networks (e.g. 3G, 4G, and so forth), or any combination thereof.

Furthermore, the client device(s) 110(1)-110(N) may include any sort of electronic device, such as a cellular phone, a smart phone, a tablet computer, an electronic reader, a media player, a gaming device, a personal computer (PC), a laptop computer, etc. The client device(s) 110(1)-110(N) may have a subscriber identity module (SIM), such as an eSIM, to identify the client device(s) 110(1)-110(N) to a telecommunication service provider network (also preferred to herein as "telecommunication network").

Figure 2:
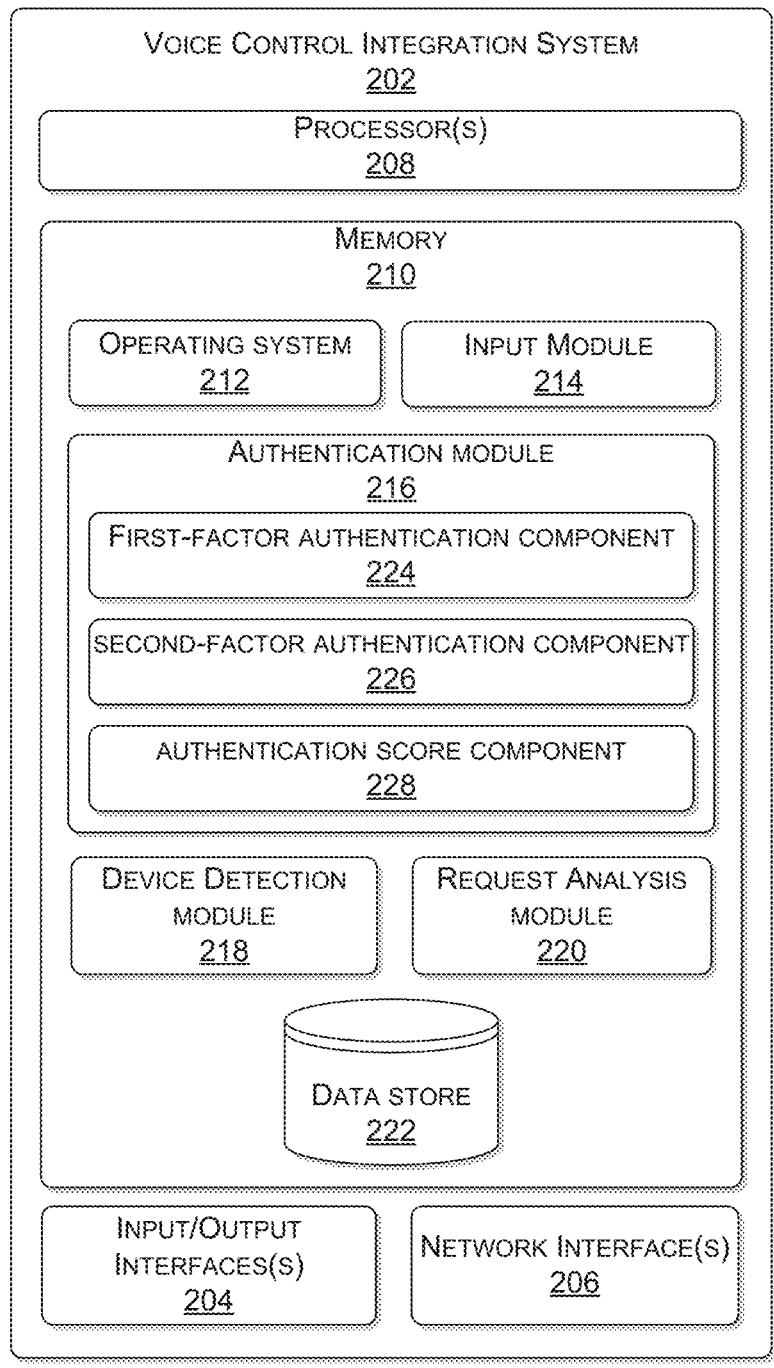
FIG. 2 illustrates a block diagram of a voice control integration system that may selectively automate an action associated with an incoming voice command from a client.

FIG. 2 illustrates a block diagram of a voice control integration system 202 that may selectively automate an action associated with an incoming voice command from a client. The voice control integration system 202 may facilitate selectively interacting with a computing resource, based on an incoming voice command of a client. Further, the voice control integration system may provide a means to authenticate an identity of a client, identify a server or client device that is associated with the incoming voice command, and determine an intended meaning of the incoming voice command. The server may correspond to a service provider, such as a telecommunications service provider. Further, the client device may be associated with the client, such as an entertainment system, a television system, a thermostat, or any client device that may be communicatively coupled to the voice control integration system via one or more communication networks.

In the illustrated example, the voice control integration system 202 may correspond to the voice control integration system 102. Further, the voice control integration system 202 may include input/output interface(s) 204. The input/output interface(s) 204 may include any type of output interface known in the art, such as a display (e.g. a liquid crystal display), speakers, a vibrating mechanism, or a tactile feedback mechanism. Input/output interface(s) 204 also include ports for one or more peripheral devices, such as headphones, peripheral speakers, or a peripheral display. Further, the input/output interface(s) 204 may further include a camera, a microphone, a keyboard/keypad, or a touch-sensitive display. A keyboard/keypad may be a push button numerical dialing pad (such as on a typical telecommunication device), a multi-key keyboard (such as a conventional QWERTY keyboard), or one or more other types of keys or buttons, and may also include a joystick-like controller and/or designated navigation buttons, or the like.

Additionally, the voice control integration system 202 may include network interface(s) 206. The network interface(s) 206 may include any sort of transceiver known in the art. For example, the network interface(s) 206 may include a radio transceiver that performs the function of transmitting and receiving radio frequency communications via an antenna. In addition, the network interface(s) 206 may also include a wireless communication transceiver and a near field antenna for communicating over unlicensed wireless Internet Protocol (IP) networks, such as local wireless data networks and personal area networks (e.g. Bluetooth or near field communication (NFC) networks). Further, the network interface(s) 206 may include wired communication components, such as an Ethernet port or a Universal Serial Bus (USB).

Further, the voice control integration system 202 may include one or more processor(s) 208 that are operably connected to memory 210. In at least one example, the one or more processor(s) 208 may be a central processing unit(s) (CPU), graphics processing unit(s) (GPU), a both a CPU and GPU, or any other sort of processing unit(s). Each of the one or more processor(s) 208 may have numerous arithmetic logic units (ALUs) that perform arithmetic and logical operations as well as one or more control units (CUs) that extract instructions and stored content from processor cache memory, and then executes these instructions by calling on the ALUs, as necessary during program execution. The one or more processor(s) 208 may also be responsible for executing all computer applications stored in the memory, which can be associated with common types of volatile (RAM) and/or nonvolatile (ROM) memory.

In some examples, memory 210 may include system memory, which may be volatile (such as RAM), non-volatile (such as ROM, flash memory, etc.) or some combination of the two. The memory may also include additional data storage devices (removable ad/or non-removable) such as, for example, magnetic disks, optical disks, or tape.

The memory 210 may further include non-transitory computer-readable media, such as volatile and nonvolatile, removable and non-removable media implemented in any method or technology for storage of information, such as computer readable instructions, data structures, program modules, or other data. System memory, removable storage and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information.

In the illustrated example, the memory 210 may include an operating system 212, an input module 214, an authentication module 216, a device detection module 218, a request analysis module 220, and a data store 222. The operating system 212 may be any operating system capable of managing computer hardware and software resources. The input module 214, authentication module 216, device detection module 218, and a request analysis module 220 may include routines, program instructions, objects, and/or data structures that perform particular tasks or implement particular abstract data types.

Moreover, the input module 214 may receive data associated with an incoming voice command from a client. The data may be received from a voice interaction device that is configured to detect voice commands of a client that is within a predetermined distance of the voice interaction device.

The authentication module 216 may further include a first-factor authentication component 224, a second-factor authentication component 226, and an authentication score component 228. The first-factor authentication component 224 may perform an initial authentication of an identity of a client via a voice biometric analysis of the incoming voice command. The voice biometric analysis may include an analysis of an accent of a client voice, tonality of a client voice, a refraction of sound of a client voice, frequency of a client voice, and pitch of a client voice. Further, the first-factor authentication component 224 may compare the voice biometric analysis of the incoming voice command with a voice biometric template of the client that is stored within the data store 222. In this instance, authentication of the client identity may be based on a similarity of the incoming voice command and the voice biometric template. That is, a client identity may be verified on the basis that a similarity of the incoming voice command and the voice biometric template is greater than a predetermined similarity threshold.

Moreover, the second-factor authentication component 226 may selectively initiate a two-factor authentication protocol to verify an identity of a client. A selection between a single-factor or two-factor authentication protocol may be based on data within the data store 222. Selection of a single-factor or two-factor authentication protocol may be based on the sensitivity of data that is being accessed by the voice control integration system 202. For example, with reference to a computing resource associated with a service provider, a two-factor authentication protocol may be assigned to particular actions that involve client sensitive or service provider sensitive data, such as financial distributions, adjustments to account settings, or adjustments to product settings.

Moreover, the second-factor authentication component 226 may determine a data format for presentation of the second-factor authentication protocol. In some examples, the data format may correspond to an audio data format, an image data format, or a video data format. In one example, the second-factor authentication protocol may involve requesting that a client audibly respond to a phrase or question transmitted by a voice interaction device. In another example, the second-factor authentication component 226 may generate a second-factor authentication protocol that presents a client with image data or video data, followed by a request to respond to a question or phrase that relates to the image data or video data. For example, the second-factor authentication component 226 may transmit a data packet to a client device that is proximate to the client at a time that the client broadcasts the incoming voice command. The data packet may include the image data or the video data of the second-factor authentication protocol. Further, the second-factor authentication component 225 may transmit a message towards the client, via the voice interaction device or the client device. The message may request the client to respond to a question or phrase that is associated with a presentation of the image data or video data. A verification of the client identity may be based at least in part on a correct response to the question or phrase, as it relates to the image data or video data.

Furthermore, the authentication score component 228 may generate and associate an authentication score with particular authentication schema, and particular types of access to computing resources. For example, the authentication score component 228 may associate a first authentication score with a voice biometric analysis of an incoming voice command, and a second, relatively higher, authentication score with an authentication schema that combines the voice biometric analysis and a second-factor authentication. Further, the authentication score component 228 may further associate an authentication score threshold for particular types of access to particular computing resources. For example, the authentication score threshold for access to a financial account may be different (i.e. relatively higher) than an authentication score threshold to activate an entertainment system. The authentication scores may be set by the client or operator of the computing resource being accessed. In that regard, the authentication score component 228 may select an appropriate authentication scheme based at least in part on the authentication score of the appropriate authentication scheme being greater than the authentication score threshold for the particular type of access to the computing resource.

An authentication score, and corresponding authentication score threshold, may be alpha-numeric (i.e. 0 to 10, or A to F), descriptive (i.e. low, medium, or high), based on color (i.e. red, yellow, green), or any other suitable rating scale, or combination thereof. In some examples, an authentication scheme having a high authentication score (i.e. 5 to 10, high, or green) may reflect a high level of confidence in an accuracy of the authentication scheme relative to an authentication scheme with a low authentication score (i.e. 0 to 5, low, or, red). That is, an authentication scheme with a high authentication score is less likely to permit fraudulent access to a computing resource, when compared to an authentication scheme with a relatively lower authentication score. Additionally, a high authentication score threshold may reflect a requirement for an authentication scheme with a correspondingly high authentication score.

Additionally, the device detection module 218 may detect and identify a client device based on proximity to the client at a point in time that the voice interaction device, or the voice control integration system, receives an incoming voice command. The purpose of doing so may be to provide the client with data associated with a two-factor authentication protocol.

In some examples, the device detection module 218 may further detect and identify a client device based on the data format that the client device is configured to present. For example, the second-factor authentication component 226 may generate a second-factor authentication protocol that involves the presentation of image data. In this example, the device detection module 218 may detect and identify a client device that is configured to present image data, and that is proximate to the client at a point in time that the incoming voice command is delivered.

Moreover, the request analysis module 220 may parse content of an incoming voice command via a natural language processing algorithm and a natural language understanding algorithm to identify a computing resource that is associated with the incoming voice command, and an intended meaning of the incoming voice command. The request analysis module 220 may further determine a request that is associated with the incoming voice command, based at least in part on the intended meaning. In some examples, the request may be explicitly stated within the incoming voice command. In other examples, the request may be implied, based on an intended meaning. For example, an incoming voice command that states "why did my cell phone stop working?" may implicitly request a diagnostic check of the client device and/or a telecommunications service associated with the client device.

Additionally, the data store 222 may store biometric templates of a client voice print for the purpose of conducting a first-factor authentication of a client identity. In some examples, the first-factor authentication may be performed on the incoming voice command as delivered by the client. Further, the client voice print may include a predefined template of an accent of a client voice, tonality of a client voice, a refraction of sound of a client voice, frequency of a client voice, and pitch of a client voice.

Further, the data store 222 may include a record of a selection of a single-factor or two-factor authentication protocol for each computing resource. In some examples, the data store 222 may include an indication of a single-factor or two-factor authentication protocol for all actions associated with a particular computing resource. In other examples, the data store 222 may include an additional level of granularity by indicating that a two-factor authentication protocol may be associated with a portion of, but not all, client interactions with a computing resource. For example, the data store 222 may include an indication that assigns a two-factor authentication protocol for particular interactions that involve client sensitive or service provider sensitive data, such as financial distributions, adjustments to account settings, or adjustments to product settings. In this example, a single-factor authentication protocol may be assigned to all other client interactions with that particular computing resource.

Additionally, the data store 222 may include a client account that is associated with the client. The client account may comprise a client profile that includes an indication of the service providers and client devices that are associated with a client, along with corresponding authentication protocols. In some instances, the authentication protocols may be assigned to all actions associated with a computing resource of a service provider or client device. In other examples, authentication protocols may be assigned to particular actions associated with computing resources of a service provider or client device. Further, a client account may include support data that may be help fulfill a client request. The support data may include, but is not limited to, diagnostic data associated with a client device or a service provider, a current geographic location of a client device, client profile data such as financial data, client account data and service history with a particular service provider, or a record of previous client interactions with a particular service provider. For example, consider an incoming voice command that requests help with the functionality of a client device. The voice control integration system 202 may determine that diagnostic test data associated with the client device may help resolve the request. Thus, the voice control integration system 202 may access diagnostic test data associated client device from the client account, and in doing so, transmit a data packet to the client device that dynamically adjusts a product setting of the client device. Product settings may include, but are not limited to, client account settings, operating system settings, network signal strength settings, and data through-put settings.

Figure 3:
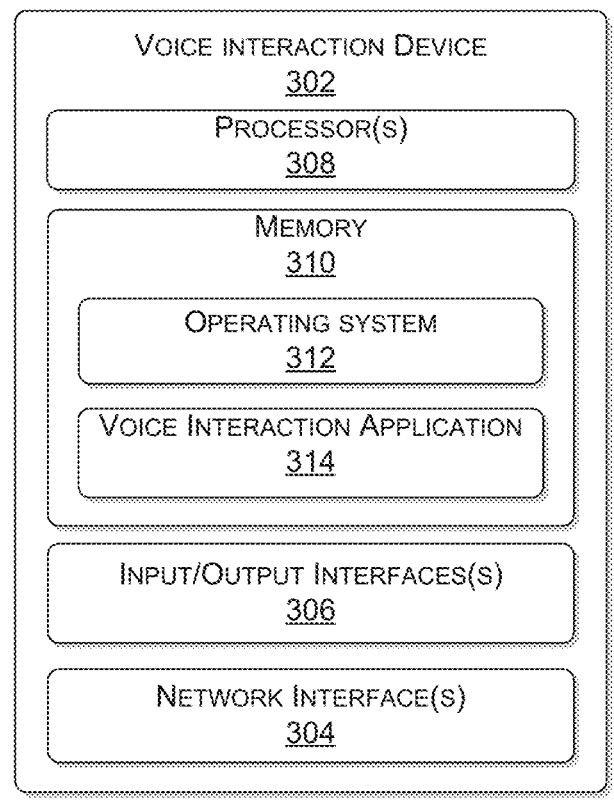
FIG. 3 illustrates a block diagram of a voice interaction device 302 that selectively receives and transmits audible communications from a client.

FIG. 3 illustrates a block diagram of a voice interaction device 302 that selectively receives and transmits audible communications to and from a client. The voice interaction device 302 may correspond to the voice interaction device 112. Particularly, the voice interaction device 302 may be communicatively coupled to the voice control integration system 202 via network interface(s) 304. The network interface(s) 304 may correspond to network interface(s) 206. In this example, the voice interaction device 302 may transmit and receive data to and from the voice control integration system 202, or one or more computing resources, via the network interface(s) 304. The data may include audible data received from a client, audible data intended for transmission to the client, and data packets of computer executable instructions received from the voice control integration system 202 that are intended for transmission to a computing resource. In some examples, the data packets may automate a performance of one or more actions on the computing resource.

Further, the voice interaction device 302 may include input/output interface(s) 306 that transmit and receive audible data to and from a client. The input/output interface(s) 306 may correspond to the input/output interface(s) 204. For example, the input/output interface(s) 306 may include a speaker component and a microphone component that selectively transmits and receives audible communications to and from a client. The microphone may be configured to receive audible data from a client that is located within a predetermined distance of the voice interaction device 302. In various examples, the proximity of the voice interaction device 302 to the client is based at least in part on a capability of the microphone to capture audible data from the client.

In the illustrated example, the voice interaction device 302 may include one or more processor(s) 308 operably connected to memory 310. The one or more processor(s) 308 may correspond to the one or more processor(s) 208, and the memory 310 may correspond to the memory 210.

In the illustrated example, the memory 310 may include an operating system 312 and a voice interaction application 314. The operating system 312 may be used to implement the voice interaction application 314. The operating system may be any operating system capable of managing computer hardware and software resources. The voice interaction application 314 may include routines, program instructions, objects, and/or data structures that perform particular tasks or implement particular abstract data types.

Further, the voice interaction application 314 may be configured to communicate audio data with the voice control integration system 202. In some examples, the voice interaction application 314 may be configured to perform the computational processing that corresponds to the one or more modules of the voice control integration system 202, such as the authentication module 216, the device detection module 218, the request analysis module 220, and the data store 222. In some examples, the voice interaction application 314 may include a data store that corresponds to data store 222.

Figure 4A:
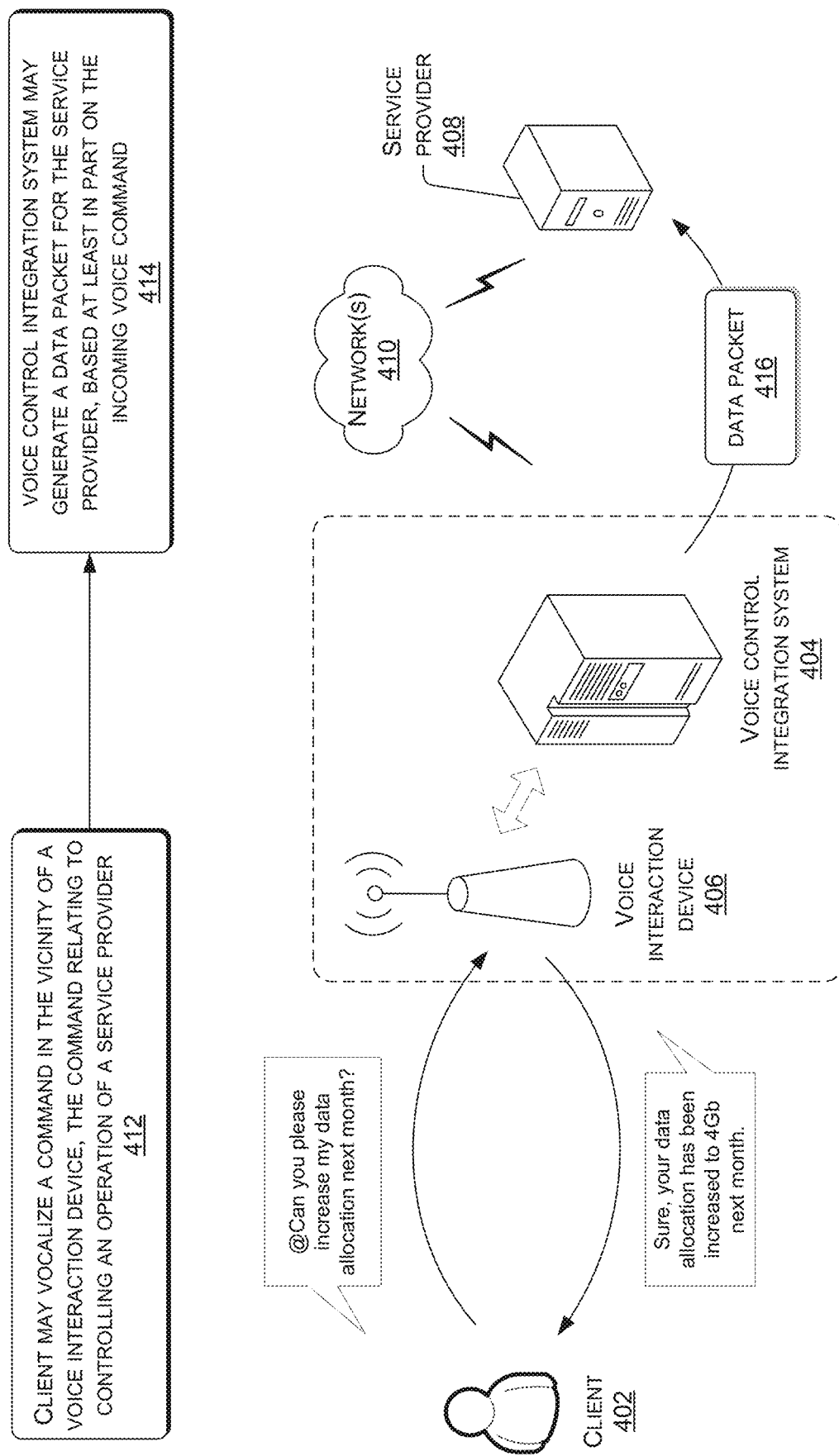
FIGS. 4A, 4B, and 4C illustrate a block diagrams of steps relating to a client interaction with the voice control integration system via a voice interaction device.
Figure 4B:
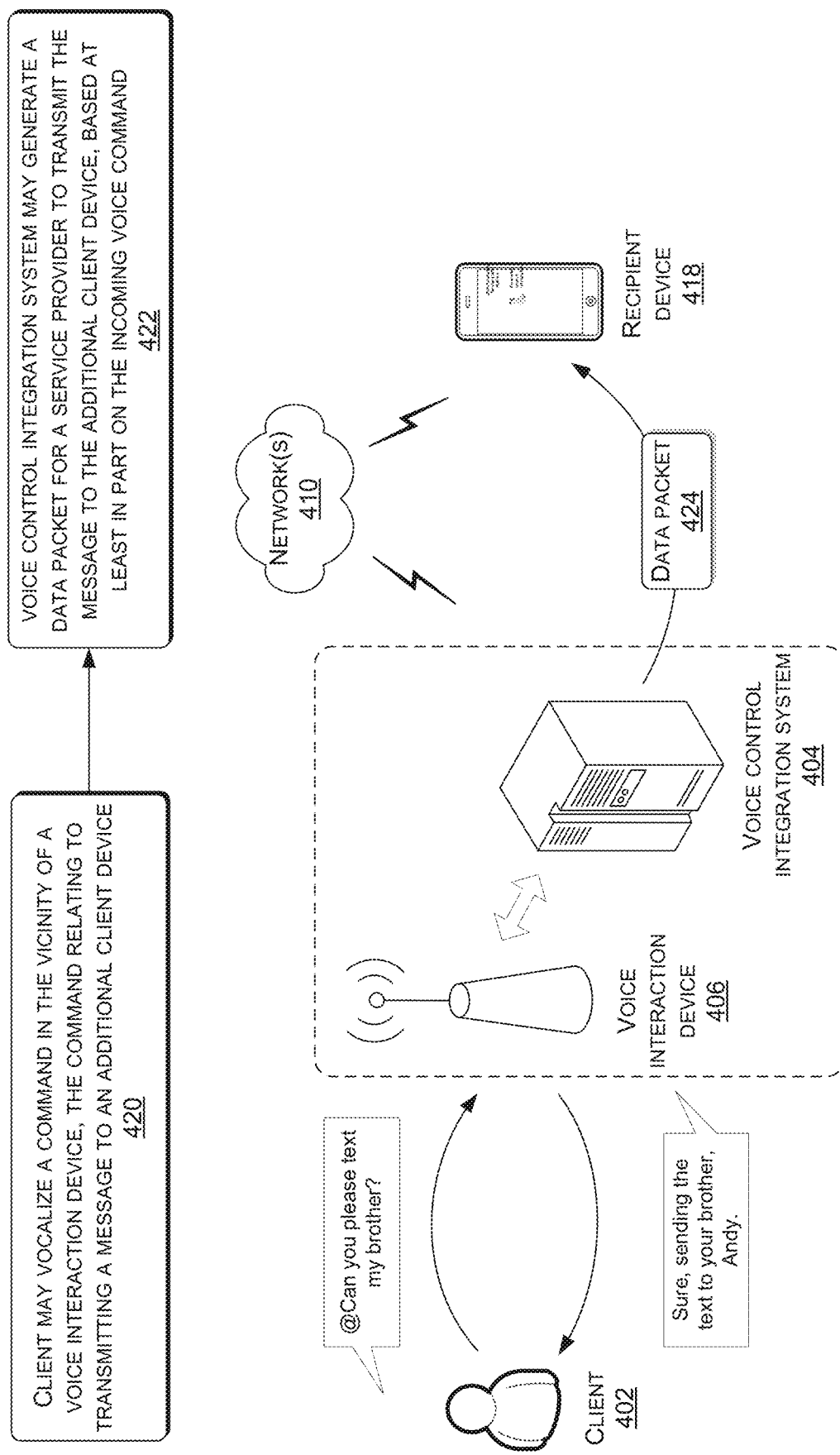
Figure 4C:
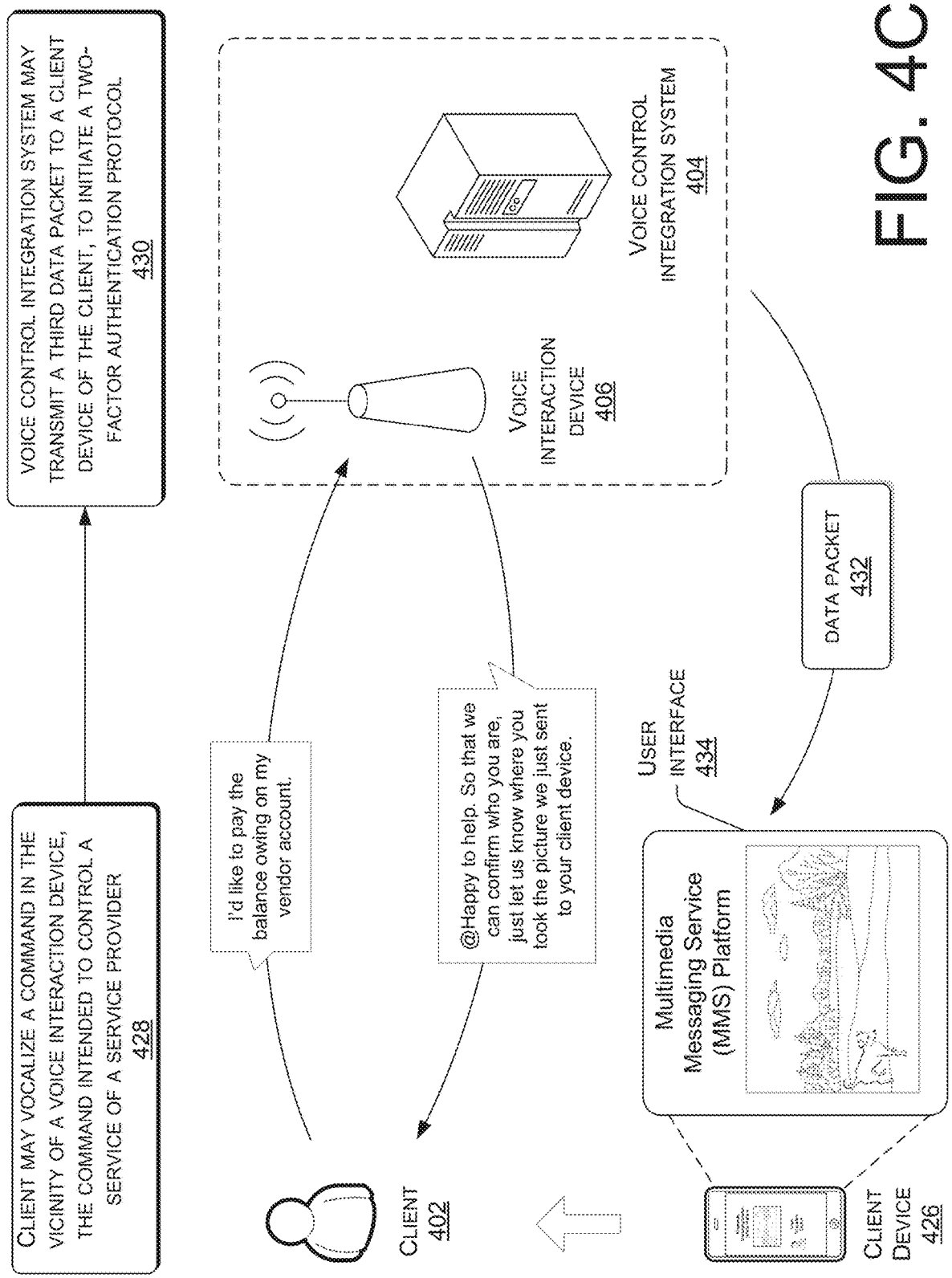

FIGS. 4A, 4B, and 4C illustrate block diagrams of steps relating to an interaction of a client 402 with the voice control integration system 404 via a voice interaction device 406. In various examples, the client 402 may interact with the voice control integration system 404 to automate performance of one or more actions associated with a computing resource. The computing resource may correspond to a server of a service provider, such as a telecommunications service provider. Alternatively, or additionally, the computing resource may correspond to a client device that is associated with the client, and that may be communicatively coupled to the voice control integration system 404.

FIG. 4A illustrates a block diagram of a client interaction that is intended to control an operation of a service of a service provider 408. The voice control integration system 404 may be communicatively coupled to a server of the service provider 408 via the one or more network(s) 410. The one or more network(s) 410 corresponds to one or more network(s) 114.

At block 412, the client 402 may vocalize an incoming voice command in proximity to a voice interaction device 406. Particularly, the client 402 may vocalize an incoming voice command to create, adjust, or delete a service parameter of the service provider 408. The service parameter may correspond to a feature of a client account, such as a data usage allocation, or activation of a service subscription feature, and so forth. Further, the voice interaction device 406 may transmit the incoming voice command to the voice control integration system 404. The voice control integration system 404 may parse content of the incoming voice command to authenticate the client, identify the client device, and determine an intended meaning of the incoming voice command.

At block 414, the voice control integration system 404 may generate and deploy a data packet 416 that automates performance of an action based at least in part on the parsed content of the incoming voice command. The voice control integration system 404 may transmit the data packet 416 to the service provider 408, via the one or more network(s) 410. In doing so, the voice control integration system 404 may cause the voice interaction device 406 to audibly transmit a message to the client 402 that confirms performance of the action.

FIG. 4B illustrates a block diagram of a client interaction that is intended to transmit a message to a recipient device 418. The message may include an audio message or a short message service (SMS) communication. Additionally, or alternatively, the client interaction may intend for transmission of a data file to the recipient device 418. The data file may be any type of data file such as an image file, audio file, video file, and so forth. Further, the data file may be stored on the client device, or accessible via a client account.

At block 420, the client 402 may vocalize an incoming voice command in proximity to a voice interaction device 406. The incoming voice command may dictate a message that is intended for transmission to a recipient device 418. Additionally, the incoming voice command may identify a format of the message (i.e. audio, SMS, or MMS communication), and an identifier of recipient device 418. In some examples, the message may also include a reference to a data file that is to be transmitted with the message, to the recipient device 418.

The voice interaction device 406 may transmit the incoming voice command to the voice control integration system 404, via one or more network(s) 410. The voice control integration system 404 may parse content of the incoming voice command to copy out the message, authenticate an identity of the client 402, and identify the recipient device 418. In one example, the voice control integration system 404 may identify the recipient device 418 by cross-referencing portions of the incoming voice command with a client profile associated with the client 402. Particularly, the client 402 may vocalize a recipient's name in the incoming voice command. The recipient may be a person, business, or other entity. The recipient's name may correspond to a title, nickname, business name, or colloquial identifier, such as, ACME store, my work, my wife's work, boss, partner, mother, father, wife, husband, sister, brother, daughter, or son, and so forth.

Furthermore, the voice control integration system 404 may parse through a client profile associated with the client 402 to identify a recipient device 418 that is associated with the recipient, based at least in part on the recipient's name. Thereafter, the voice control integration system 404 may identify a corresponding recipient device 418. In the illustrated example, the client vocalizes a voice command to send a text message to their brother. In doing so, the voice control integration system 404 may parse through a client profile associated with the client 402 to identify and confirm 'Andy,' the client's brother, as the intended recipient of the text message.

Further, the incoming voice command may also reference a data file that is to be sent with the message to the recipient device 418. The incoming voice command may identify the storage location of the data file. For example, the incoming voice command may state that a photo taken on a particular client device of the client 402, is to be sent to the recipient device 418. Alternatively, absent identifying a storage location, the voice control integration system 404 may search one or more data-stores associated with the client 402, for the date file. In one example, the voice control integration system 404 may parse through data-store(s) of one or more client device(s) that are associated with the client 402, whereby the one or more client device(s) are associated with the client on the voice control integration system 404. Alternatively, or additionally, the voice control integration system 404 may parse through a client account associated with the client 402 on a data-store of the voice control integration system 404, itself.

At block 422, the voice control integration system 404 may generate a data packet 424 that automates transmission of the message, and data file, to the recipient device 418. In one example, the voice control integration system 404 may be integrated with a telecommunications service provider, and automatically transmit the data packet 424 to the recipient device 418, via one or more network(s) 410. Alternatively, the voice control integration system 404 may transmit the data packet 424 to the telecommunications service provider, via the one or more network(s) 410, for further delivery to the recipient device 418.

FIG. 4C illustrates a block diagram of a two-factor authentication protocol initiated by the voice control integration system 404 for the purpose of providing a client 402 with access to a computing resource. In some examples, the first-factor of the authentication protocol may correspond to an initial authentication of the client identity via a voice biometric analysis of the incoming voice command. Further, the second-factor of the authentication protocol may correspond to transmitting an audible request to the client 402 that asks the client 402 to authenticate an image that is transmitted to a client device 426 associated with the client 402.

At block 428, the client 402 may vocalize an incoming voice command in proximity to a voice interaction device 406, whereby the incoming voice command is intended to control a service of a service provider. In the illustrated example, the client 402 may vocalize an incoming voice command, such as "I'd like to pay the balance owing on my vendor account." In this example, the voice interaction device 406 may further transmit the incoming voice command to the voice control integration system 404. The voice control integration system 404 may parse content of the incoming voice command to authenticate the client, identify a server of a service provider, and determine an intended meaning of the incoming voice command. In the illustrated example, the voice control integration system 404 may determine that a two-factor authentication protocol is required to perform an action relating to payment of the balance owing on a vendor account.

At block 430, the voice control integration system 404 may transmit a data packet 432 to a client device 426 associated with the client 402 for the purpose of initiating a two-factor authentication protocol. In various examples, the voice control integration system 404 may detect and identify the client device 426 based on proximity to the client 402 at a point in time that the voice interaction device 406, or the voice control integration system 404, receives the incoming voice command. Further, the data packet 432 may include computer executable instructions that automate a presentation of an image on a user interface 434 of the client device 426. In the illustrated example, the image may be associated with the second-factor of the two-factor authentication protocol. Further, the voice control integration system 404 may cause the voice interaction device 406 to transmit a message to the client 402 that audibly requests the client 402 to respond to a question or phrase that relates to the image that is presented on the user interface 434 of the client device 426.

FIGS. 5, 6, 7, 8, and 9 present processes 500, 600, 700, 800, and 900 that relate to operations of the voice control integration system. Each of processes 500, 600, 700, 800, and 900 illustrate a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 500, 600, 700, 800, and 900 are described with reference to the computing environment 100 of FIG. 1.

Figure 5:
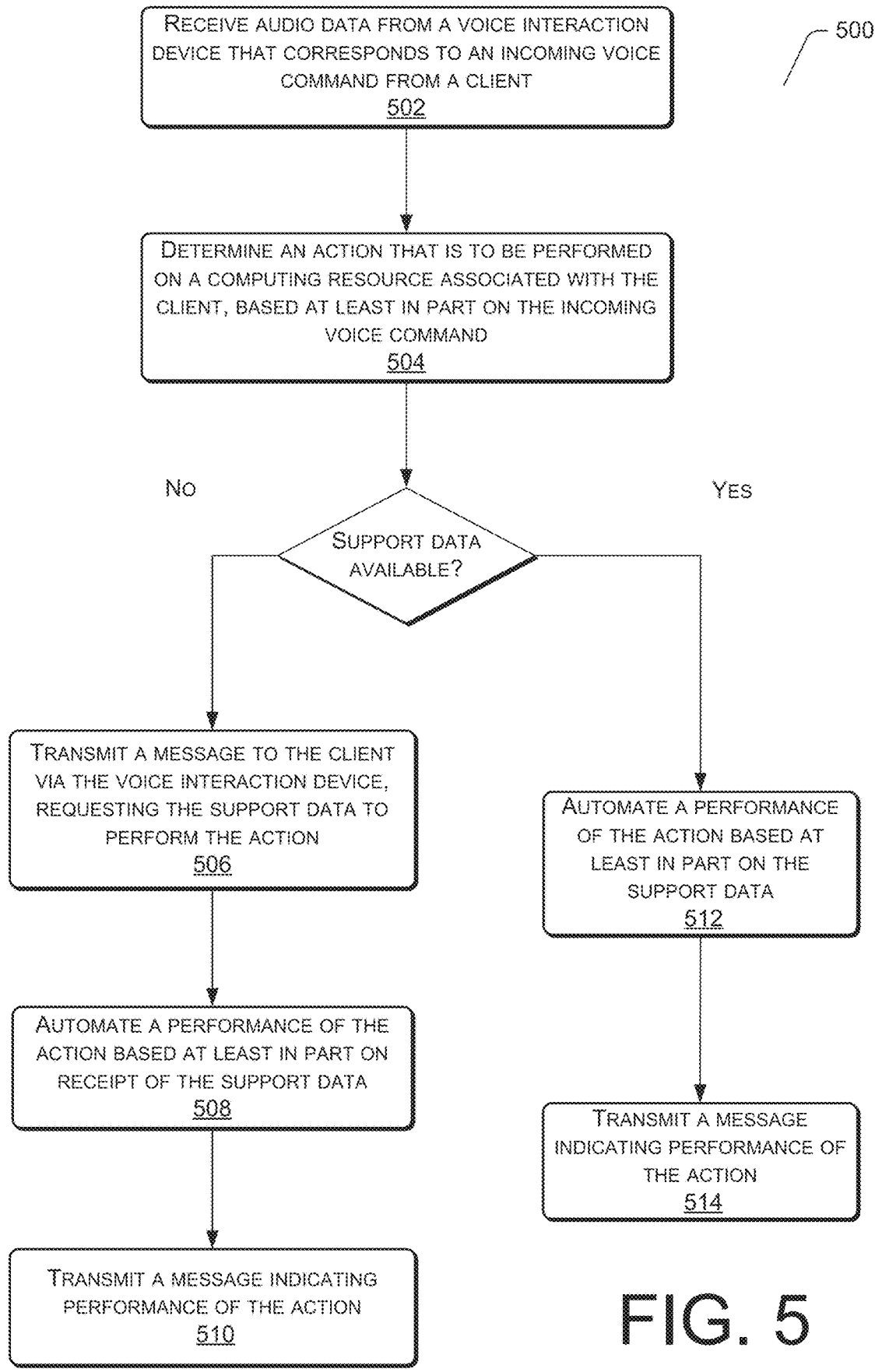
FIG. 5 illustrates a voice control integration system process for performing at least one action associated with a computing resource that is based at least in part on receipt of an incoming voice command from a voice interaction device.

FIG. 5 illustrates a voice control integration system process for performing at least one action associated with a computing resource that is based at least in part on receipt of an incoming voice command from a voice interaction device. In at least one example, the computing resource may correspond to a remote server of a service provider that provides telecommunications services to a client device. In other examples, the computing resource may correspond to a client device that is associated with the client, such as an entertainment system, a television system, a thermostat, or any client device that may be communicatively coupled to the voice control integration system via one or more communication networks.

At 502, the voice control integration system may receive audio data from a voice interaction device that corresponds to an incoming voice command from a client. The voice interaction device may comprise of a speaker component and microphone component that selectively transmits and receives audible communications to and from a client.

At 504, the voice control integration system may parse content of the incoming voice command via at least one of a natural language processing algorithm or a natural language understanding algorithm to determine an intended meaning of the incoming voice command. In doing so, the voice control integration system may determine an action that is to be performed on a computing resource associated with the client. In a non-limiting example, the incoming voice command may relate to modifying a client account that is associated with a service provider. In this example, the voice control integration system may determine that the action that is to be performed on a computing resource, corresponds to modifying the client account that is stored on the computing resource of the service provider.

At 506, the voice control integration system may determine that support data required to perform the action is not available within a client profile of the voice control integration system. In doing so, the voice control integration system may transmit a message to the client via the voice interaction device, requesting the support data. In some examples, the support data may correspond to authentication credentials that associate the client with the service provider. In other examples, the support data may correspond to client-specific data, such as a geographic location of the client at a point in time of receipt of the incoming voice command.

At 508, the voice control integration system may automate performance of the action based at least in part on a receipt of the support data from the client. In some examples, the voice control integration system may receive the support data via a client interaction with the voice interaction device, or via an alternate computing resource that is communicatively coupled to the voice control integration system.

At 510, the voice control integration system may transmit a message to the client indicating a performance of the action. In some examples, the message may be delivered audibly via the voice interaction device. Alternatively, or additionally, the message may be delivered to an alternate computing resource that is communicatively coupled to the voice control integration system, such as a mobile telecommunication device.

At 512, the voice control integration system may determine that support data that is required to perform the at least one action is available within a client account associated with the client. In various examples, the client account may be stored within a data store of the voice control integration system. In other examples, the client account may be stored on a remote server of a service provider that is accessible by the voice control integration system.

Further, the voice control integration system may automate performance of the action, based at least in part on the availability of the support data. For example, the support data may include authentication credentials of a service provider account that is stored within a data store of the voice control integration system. Thus, the voice control integration system may use the authentication credentials to access the service provider account and perform the action that is based on the incoming voice command.

At 514, the voice control integration system may transmit a message to the client indicating performance of the action. In some examples, the message may be delivered audibly via the voice interaction device. The voice interaction device may be an integrated component of a client device associated with the client, or a client device that is located within a predetermined proximity of the client.

Figure 6:
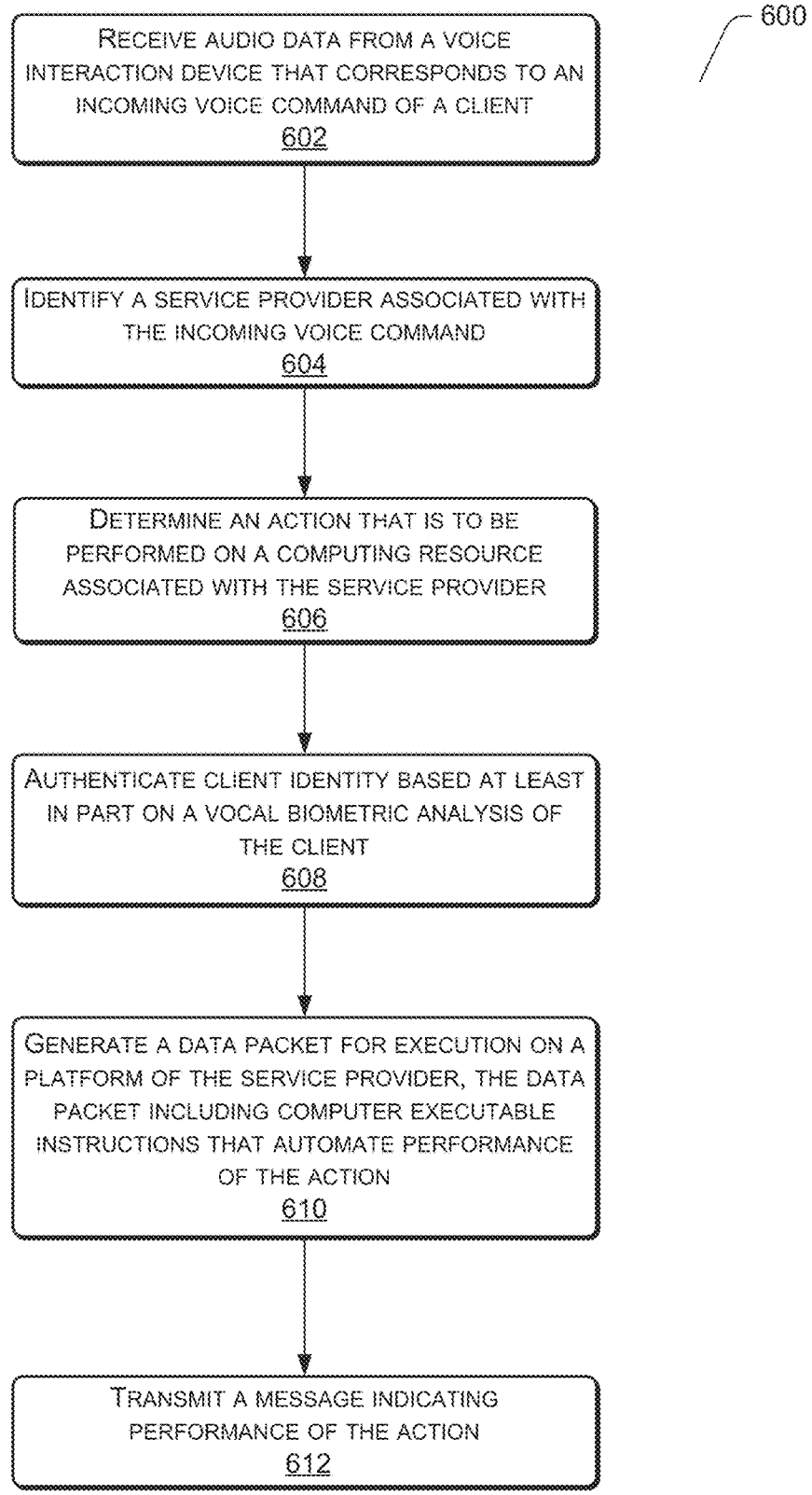
FIG. 6 illustrates a voice control integration system process for performing at least one action that is associated with a client account that is associated with a service provider.

FIG. 6 illustrates a voice control integration system process for performing at least one action that is associated with a client account that is associated with a service provider. In various examples, the client account may be stored on a remote server that is associated with the service provider. The remote server may be communicatively coupled to the voice control integration system, enabling the latter to automate the performance of an action on the remote server.

At 602, the voice control integration system may receive audio data from a voice interaction device that corresponds to an incoming voice command from a client. In some examples, the voice interaction device may be located within a predetermined proximity of the client.

At 604, the voice control integration system may parse content of the incoming voice command to identify a service provider to which the incoming voice command had been directed. For example, a client may enunciate an incoming voice command to verify an account setting of a client account that is associated with a particular service provider. In doing so, the voice control integration system may identify the particular service provider from the incoming voice command, and further identify computing resources associated with the particular service provider that may facilitate verifying the account setting of the client account. In some examples, the data-store of the voice control integration system may include data records that identify the computing resources of one or more service providers.

At 606, the voice control integration system may determine an action that is to be performed on the computing resource associated with the service provider. In a non-limiting example, the action may relate to changing an account setting, paying an outstanding invoice, soliciting a request for service support, or any other request that may be performed via a communicative connection with the service provider.

At 608, the voice control integration system may authenticate the client based at least in part on a voice biometric analysis of the incoming voice command. The voice biometric analysis may include an analysis of an accent, tonality, refraction of sound, frequency, and pitch of the client voice. Further, the incoming voice command may be compared with a voice biometric template of the client that is stored within the data store of the voice control integration system. In this instance, authentication of the client identity may be based on a similarity of the incoming voice command and the voice biometric template.

At 610, in response to authenticating the client identity of the client, the voice control integration system may generate a data packet for execution on a platform of the service provider, the data packet including computer executable instructions that automate performance of the action. In a non-limiting example, the computer executable instructions may be configured to perform one of a plurality of actions, including initiating a service support request with a service provider representative, changing an account setting associated with the service provider, submitting payment of an outstanding invoice, or initiating a diagnostic check of a client device that is associated with the service provider.

At 612, the voice control integration system may transmit a message to the client indicating performance of the action. In some examples, the message may be delivered audibly via the voice interaction device. Alternatively, or additionally, the message may be delivered to an alternate computing resource that is communicatively coupled to the voice control integration system, such as a mobile telecommunication device.

Figure 7:
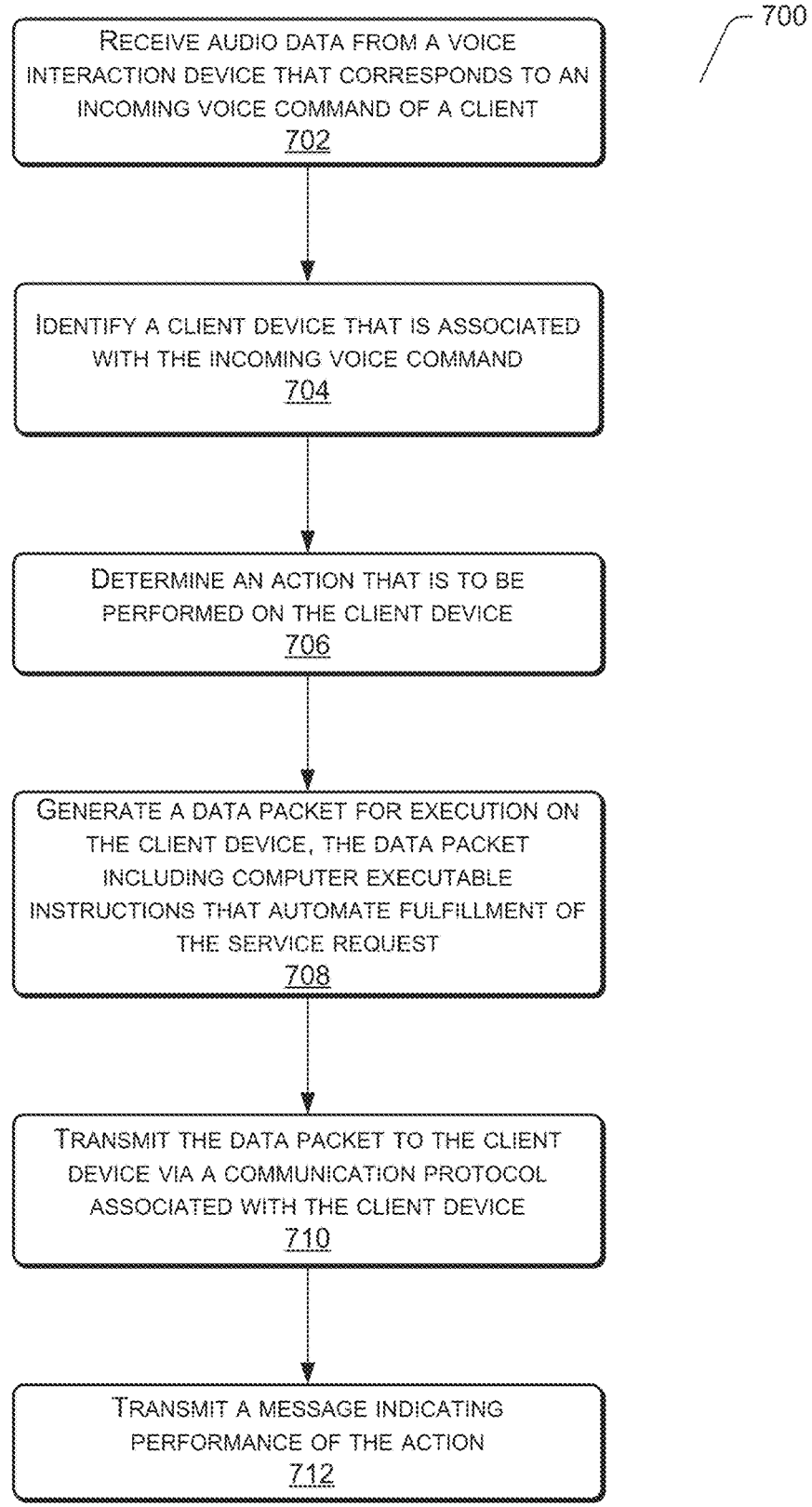
FIG. 7 illustrates a voice control integration system process for performing at least one action associated with a client device associated with the client.

FIG. 7 illustrates a voice control integration system process for performing at least one action associated with a client device associated with the client. In some examples, the client device may correspond to a client device, such as a mobile telecommunications device. Alternatively, or additionally, the client device may correspond to an entertainment system, a television system, a thermostat, or any other client device that be communicatively coupled to the voice control integration system via one or more communication networks.

At 702, the voice control integration system may receive audio data from a voice interaction device that corresponds to an incoming voice command of a client. In some examples, the voice interaction device may selectively communicate with the voice integration system. Further, the voice interaction device may include a speaker component and a microphone component that transmits and receives audio communications from a client.

At 704, the voice control integration system may parse content of the incoming voice command via a natural language processing algorithm and a natural language understanding algorithm to identify a client device that is associated with the incoming voice command. In some examples, the incoming voice command may directly enunciate an identity of the client device. For instance, the incoming voice command may state "turn on the entertainment system." Alternatively, the incoming voice command make an indirect reference to the client device. For instance, the voice integration system may determine that an incoming voice command that states "turn down the temperature," refers to a thermostat client device.

At 706, the voice control integration system may determine an action that is to be performed on the client device. In a non-limiting example, the action may relate to activating a client device, such as an entertainment system. Alternatively, or additionally, the action may correspond to sending a short message service (SMS) communication via a mobile telecommunications device.

At 708, the voice control integration system may generate a data packet for execution on the client device, the data packet including computer executable instructions that automate performance of the action on the client device. The computer executable instructions may be configured to perform one of a plurality of actions, including controlling an operation of a client device or initiating a diagnostic check of the client device. In a non-limiting example, an action associated with a mobile telecommunications device may include answering an incoming call, initiating an outgoing call, transmitting an SMS message or a multimedia messaging service (MMS) message, or having the voice interaction device read an incoming SMS message.

At 710, the voice control integration system may transmit the data packet via a communication protocol that is associated with the client device. In various examples, the communication protocol may include unlicensed wireless Internet Protocol (IP) communications, a Bluetooth protocol, or near field communication (NFC) protocol. In some examples, the communication protocol may be based on wired communications via an Ethernet port or a Universal Serial Bus (USB).

In some examples, the voice control integration system may transmit the data packet directly to the client device via an appropriate communication protocol. Alternatively, the voice control integration system may indirectly transmit the data packet to the client device, via the voice interaction device. For example, the client device may be configured to send and receive data via a near field communication protocol, such as a Bluetooth protocol. In this instance, provided the voice interaction device is located within a requisite distance of the client device to enable Bluetooth connectivity, the voice control integration system may transmit the data packet to the voice interaction device along with computer executable instructions that facilitate further transmission to the client device, via the Bluetooth protocol.

At 712, the voice control integration system may transmit a message to the client indicating performance of the action. In some examples, the message may be delivered audibly via the voice interaction device. Alternatively, or additionally, the message may be delivered to an alternate computing resource that is communicatively coupled to the voice control integration system, such as a mobile telecommunication device.

Figure 8:
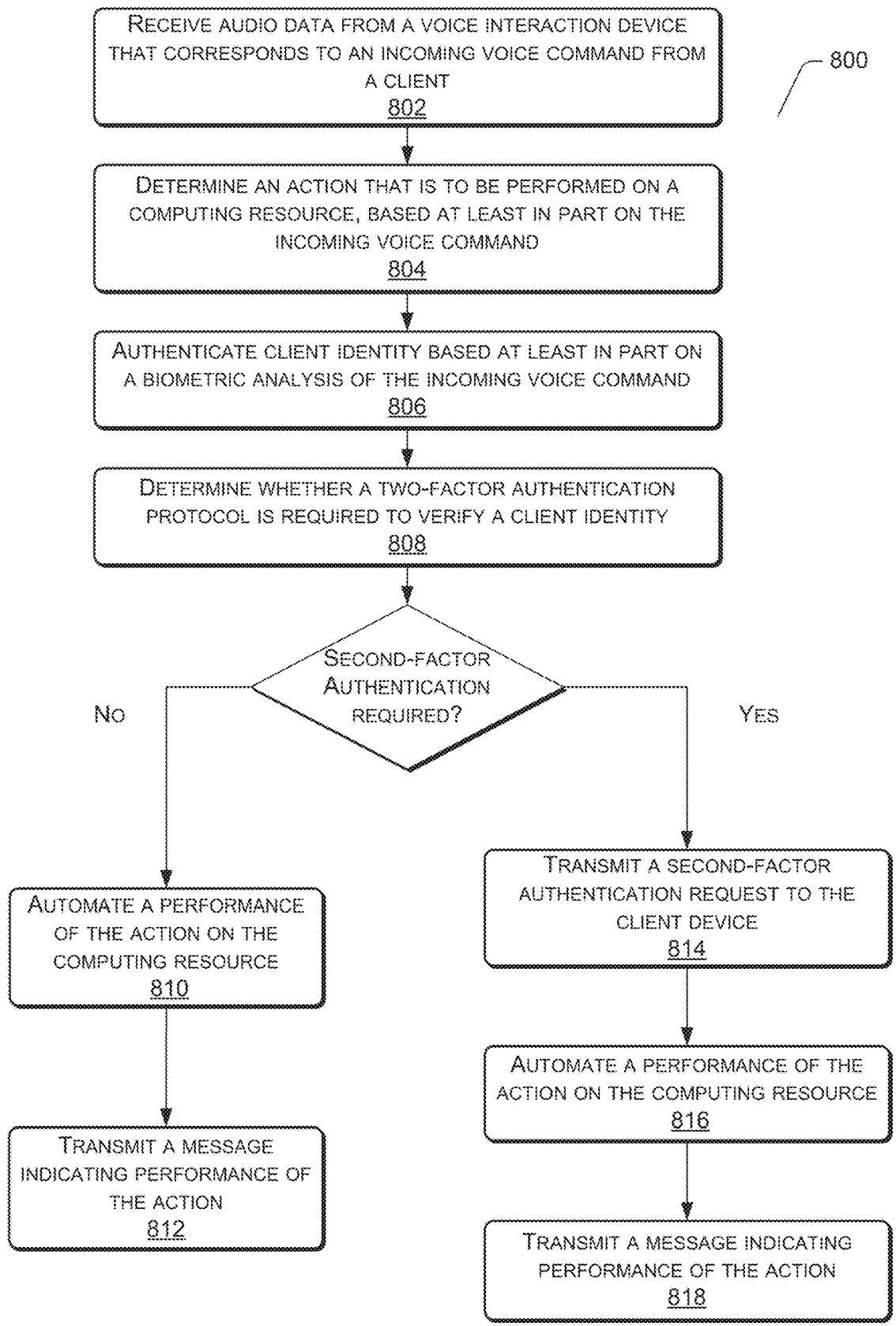
FIG. 8 illustrates a voice control integration system process for authenticating a client identity based on a single-factor or two-factor authentication protocol.

FIG. 8 illustrates a voice control integration system for authenticating a client identity based on a single-factor authentication protocol, or alternatively a two-factor authentication protocol. In some examples, the voice control integration system may include a data store that records an association between a particular computing resource and an authentication protocol that authorizes access.

In some examples, an association between a particular computing resource and an authentication protocol may be assigned by one of a service provider or client, whomever has ownership or control over the particular computing resource. For example, an authentication protocol that authorizes access to a computing resource of a service provider may be determined by the service provider, whereas the authentication protocol that authorizes access to a client device of the client may be determined by the client. In some instances, the voice control integration system may request and receive authentication protocols from a service provider. Similarly, the voice control integration system may prompt a client, via a voice interaction device, to configure an authentication protocol for a particular client device.

Additionally, the data store may include an additional level of granularity in assigning a two-factor authentication for particular actions associated with a computing resource. For example, rather than assigning a two-factor authentication for all actions associated with a service provider, the data store may include an indication that assigns a two-factor authentication protocol for particular actions that involve client sensitive or service provider sensitive data, such as financial distributions, adjustments to account settings, or adjustments to product settings. In this example, a single-factor authentication protocol may be assigned to all other client interactions with the computing resource.

At 802, the voice control integration system may receive audio data from a voice interaction device that corresponds to an incoming voice command from a client. In some examples, the voice interaction device may be located within a predetermined distance of the client, and may include a speaker component and a microphone component that transmits and receives audio communications from a client.

At 804, the voice control integration system may parse content of the incoming voice command via a natural language processing algorithm and a natural language understanding algorithm to identify a computing resource that is associated with the incoming voice command. Further, the voice control integration system may determine an action that is to be performed on the computing resource. In a non-limiting example, the action may correspond to sending an SMS communication via a client device. Alternatively, the action may correspond to initiating a change to an account setting of a client account associated with a service provider.

At 806, the voice control integration system may authenticate the client based at least in part on a voice biometric analysis of the incoming voice command. The voice biometric analysis may include an analysis of an accent, tonality, refraction of sound, frequency and pitch of the client voice. Further, the incoming voice command may be compared with a voice biometric template of the client that is stored within the data store of the voice control integration system. In this instance, authentication of the client identity may be based on the similarity of the incoming voice command and the voice biometric template being greater than a predetermined similarity threshold.

At 808, the voice control integration system may determine whether a two-factor authentication protocol is required to verify a client identity. In various examples, the data store of the voice control integration system may include an indication of whether a particular service provider, a particular client device, or a particular action is associated with a two-factor authentication protocol.

At 810, the voice control integration system may determine that a two-factor authentication protocol is not required to implement the action on the computing resource, based at least in part on an indication within the data store of the voice control integration system. In this instance, the voice control integration system may automate performance of the action on the computing resource. In some examples, the voice control integration system may generate and transmit a data packet to the computing resource that includes computer executable instructions that automate performance of the action on the computing resource.

At 812, the voice control integration system may transmit a message to the client indicating performance of the action. In some examples, the message may be delivered audibly via the voice interaction device. Alternatively, or additionally, the message may be delivered to an alternate computing resource that is communicatively coupled to the voice control integration system, such as a mobile telecommunication device.

At 814, the voice control integration system may determine that a two-factor authentication protocol is required to implement the action on the computing resource, based at least in part on an indication within the data store of the voice control integration system. Therefore, the voice control integration system may transmit a second-factor authentication request to the client via at least one of the voice interaction device, or a client device that is within a predetermined distance of the client. Note that the first-factor of the two-factor authentication protocol may correspond to the initial authentication of the client identity at step 806. Additionally, the two-factor authentication process is discussed in further detail with reference to FIG. 9.

At 816, the voice control integration system may automate performance of the action on the computing resource, based at least in part on verifying the client identity via the two-factor authentication protocol. In some examples, the voice control integration system may generate and transmit a data packet to the computing resource that includes computer executable instructions that automate performance of the action on the computing resource.

At 818, the voice control integration system may transmit a message to the client indicating performance of the action. In some examples, the message may be delivered audibly via the voice interaction device. Alternatively, or additionally, the message may be delivered to an alternate computing resource that is communicatively coupled to the voice control integration system, such as a mobile telecommunication device.

Figure 9:
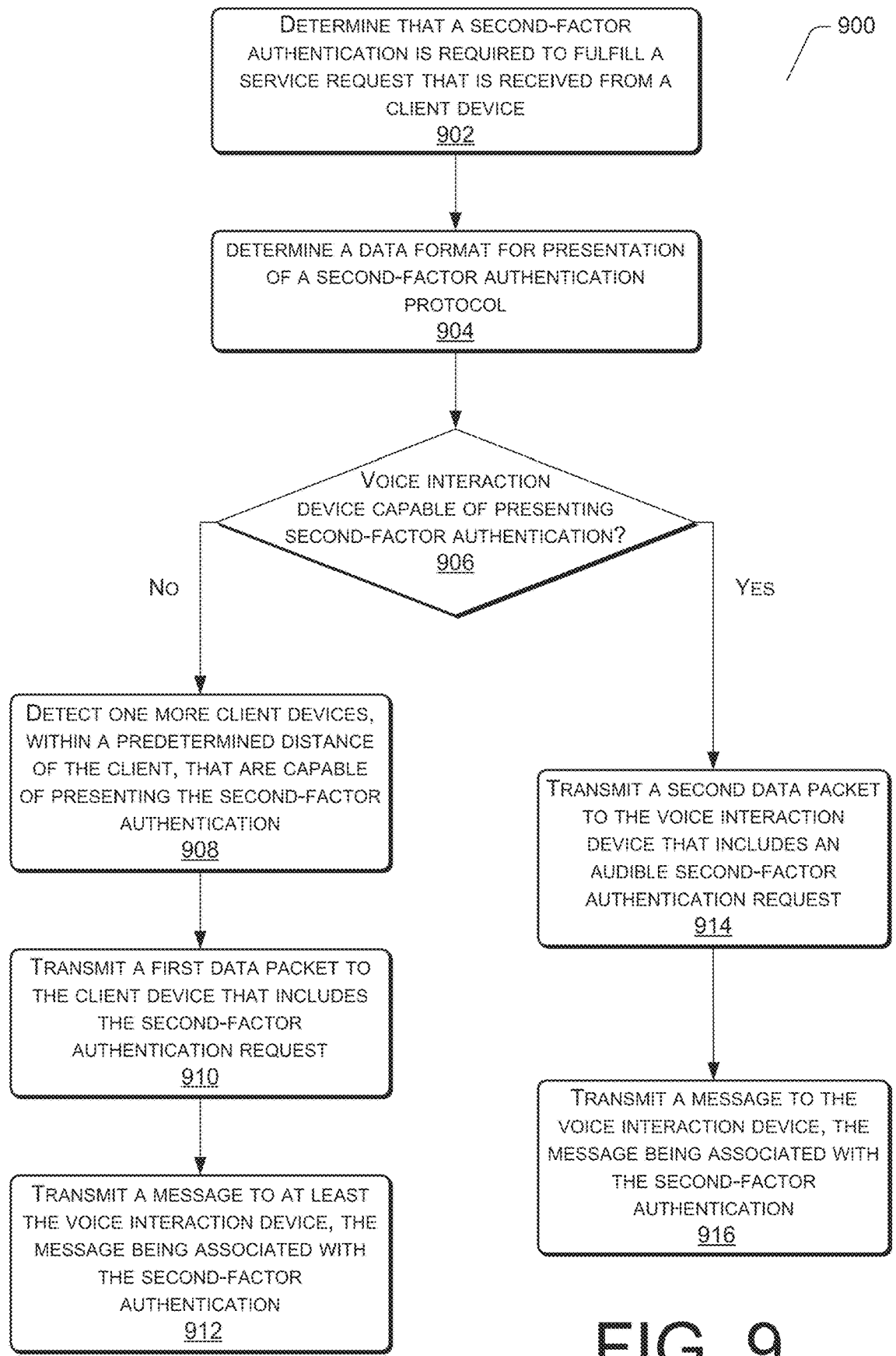
FIG. 9 illustrates a voice control integration system process for authenticating a client identity via a two-factor authentication protocol.

FIG. 9 illustrates a voice control integration system process for authenticating a client identity via a two-factor authentication protocol. In some examples, a two-factor authentication protocol may be assigned to a particular computing resource, or a particular action associated with a particular computing resource. For example, with reference to a computing resource associated with a service provider, a two-factor authentication protocol may be assigned to particular actions that involve client sensitive or service provider sensitive data, such as financial distributions, adjustments to account settings, or adjustments to product settings.

At 902, the voice control integration system may determine that a two-factor authentication protocol is required to implement a particular action on a computing resource, based at least in part on an indication within the data store of the voice control integration system. In various examples, a first-factor of the two-factor authentication protocol may correspond to an initial authentication of a client identity via the biometric analysis of the incoming voice command.

At 904, the voice control integration system may determine a data format for presentation of the second-factor authentication protocol. In some examples, the second-factor authentication protocol may request a client audibly respond to a phrase or question transmitted by a voice interaction device that is located within a predetermined distance of the client. In other examples, the second-factor authentication protocol may request a client respond to a question associated with the presentation of multimedia content, such as image data or video data. For instance, the second-factor authentication protocol may involve presenting the client with an image, followed by a request to respond to a question or phrase that is associated with a presentation of the image. The question or phrase may relate to key persons, particular objects shown in the image data, or an origin of the image data. Similarly, the second-factor authentication protocol may involve presenting the client with a video segment, followed by similar questions regarding specific details of the video segment.

At 906, the voice control integration system may determine whether the voice interaction device is capable of presenting the second-factor authentication protocol to the client. For example, the voice interaction device may be capable of transmitting an audible request for authentication to the client, however the voice interaction device may not be capable of presenting multimedia content, such as image data or video data, to the client as part of the second-factor authentication protocol.

At 908, the voice control integration system may determine that the voice interaction device is not capable of presenting the second-factor authentication protocol to the client. In other words, the second-factor authentication protocol may involve presenting image data or video data to the client. In doing so, the voice control integration system may detect a client device that is within a predetermined proximity of the client, and that is capable of presenting the second-factor authentication.

In some examples, the location of the client may be based on a location of the voice interaction device that received the incoming voice command. Thus, the voice control integration system may attempt to detect one or more client devices that are proximate to the voice interaction device. Additionally, or alternatively, the voice interaction device may attempt to detect the one or more client devices that are proximate to its location, based at least in part on near field communication protocols such as Bluetooth and NFC protocols.

At 910, the voice control integration system may transmit a first data packet to a client device that is capable of presenting the second-factor authentication protocol, and that is located proximate to the client location. In a non-limiting example, the voice control integration system may transmit multimedia data to a mobile telecommunications device of the client. Simultaneously, or substantially simultaneously, the voice interaction device may audibly prompt the client to respond to a question related to the multimedia data. Alternatively, an audible or text-based prompt may be delivered via the mobile telecommunications device.

At 912, the voice control integration system may transmit a message via at least the voice interaction device indicating an authenticity of the client identity based at least in part on receipt of a response to the second-factor authentication protocol. Further, the voice control integration system may perform an action associated with the incoming voice command, as discussed with reference to FIGS. 5-8, and based at least in part on an authenticated client identity.

At 914, the voice control integration system may determine that the voice interaction device is capable of transmitting the second-factor authentication protocol. In other words, the second-factor authentication protocol may comprise of an audible phrase or question that is intended to solicit a response from the client. Therefore, the voice control integration system may transmit a second data packet to the voice interaction device.

At 916, the voice control integration system may transmit a message via at least the voice interaction device indicating an authenticity of the client identity based at least in part on receipt of a response to the second factor authentication protocol. Further, the voice control integration system may perform an action associated with the incoming voice command, as discussed with reference to FIGS. 5-8, and based at least in part on an authenticated client identity.

CONCLUSION

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

What is claimed:

1. One or more non-transitory computer-readable media storing computer-executable instructions, that when executed on one or more processors, causes the one or more processors to perform acts comprising:

detecting, via a voice interaction device, an incoming voice communication from a client, the incoming voice communication including an implied request to perform at least one action that is associated with a computing resource;

parsing content of the incoming voice communication to identify the implied request to perform the at least one action;

identifying a client profile associated with the client based at least in part on the incoming voice communication, the client profile including a two-factor authentication protocol associated with the computing resource;

detecting a client device different from the voice interaction device;

determining a first authentication score based at least in part on an execution of a first factor of the two-factor authentication protocol at the client device;

transmitting, via the voice interaction device, a request for execution of a second factor of the two-factor authentication protocol;

determining a second authentication score based at least in part on the requested execution of the second factor of the two-factor authentication protocol at the voice interaction device; and performing the at least one action that is associated with the incoming voice communication based at least in part on a combination of at least: (i) the first authentication score associated with the client device and (ii) the second authentication score associated with the voice interaction device, wherein:

the two-factor authentication protocol varies based on a particular type of access to a particular computing resources;

the second authentication score associated with the voice interaction device is based at least in part on a voice biometric; and the first authentication score associated with the client device is independent of a voice biometric.

2. The one or more non-transitory computer-readable media of claim 1, wherein performing the at least one action corresponds to establishing a communication session between the voice interaction device and a service provider platform associated with the computing resource, and wherein the computer-executable instructions, when executed on one or more processors, causes the one or more processors to perform acts further comprising:

transmitting, to the voice interaction device, an authentication token to access the service provider platform, based at least in part on an authentication of the identity of the client via the two-factor authentication protocol that utilizes the combination of the first authentication score and the second authentication score, wherein performing the at least one action is further based at least in part on receipt of the authentication token.

3. The one or more non-transitory computer-readable media of claim 1, wherein the computer-executable instructions, when executed on one or more processors, causes the one or more processors to perform acts further comprising:

identifying, from the client profile, a voice biometric template associated with the client; and determining a similarity between a biometric voice data of a communication and the voice biometric template of the client, wherein the second authentication score is based at least in part on the similarity.

4. The one or more non-transitory computer-readable media of claim 1, wherein the computer-executable instructions, when executed on one or more processors, causes the one or more processors to perform acts further comprising:

identifying, from the client profile, a communication associated with a recipient device associated with a recipient, the recipient being associated with the client via the client profile;

receiving, via the voice interaction device, a request to send a communication to the recipient; and transmitting, via the voice interaction device, the requested communication.

5. The one or more non-transitory computer-readable media of claim 1, wherein the computer-executable instructions, when executed on one or more processors, causes the one or more processors to perform acts further comprising:

determining that support data is required for performance of the at least one action associated with the computing resource, the support data including the two-factor authentication protocol associated with the computing resource and one or more preferences associated with the computing resource; and retrieving the support data from the client profile.

6. The one or more non-transitory computer-readable media of claim 1, wherein the execution of the second factor is associated with the presentation of multimedia content.

7. The one or more non-transitory computer-readable media of claim 1, wherein the computer-executable instructions, when executed on one or more processors, causes the one or more processors to perform acts further comprising:

generating a data packet that includes computer-executable instructions that automate the performance of the at least one action with respect to the client device based at least in part on an authentication of the identity of the client;

transmitting the data packet to the client device; and transmitting a message, via the voice interaction device, indicating a performance of the at least one action.

8. A computer-implemented method comprising:

detecting, via a voice interaction device, an incoming voice communication from a client, the incoming voice communication including an implied request to perform at least one action that is associated with a computing resource;

parsing content of the incoming voice communication to identify the implied request to perform the at least one action;

identifying a client profile associated with the client based at least in part on the incoming voice communication, the client profile including an authentication protocol associated with the computing resource;

detecting a client device different from the voice interaction device;

determining a first authentication score based at least in part on the incoming voice communication detected via the voice interaction device;

determining a second authentication score based at least in part on an execution of the authentication protocol at the client device; and performing the at least one action that is associated with the incoming voice communication with respect to the computing resource, based at least in part on a combination of at least: (i) the first authentication score associated with the voice interaction device and (ii) the second authentication score associated with the client device, wherein:

the first authentication score associated with the voice interaction device is based at least in part on a voice biometric; and the second authentication score associated with the client device is independent of a voice biometric.

9. The computer-implemented method of claim 8, wherein the at least one action includes modifying an action of the client device, and the method further comprises:

generating a data packet for execution on the client device, the data packet including computer-executable instructions that automate the modifying in response to the implied request.

10. The computer-implemented method of claim 8, further comprising:

detecting at least one client device associated with the client that is within a predetermined distance of the voice interaction device, the at least one client device being configurable to present multimedia content; and
causing a user interface of the client device to present the multimedia content, wherein the multimedia content includes at least one of image data or video data.

11. The computer-implemented method of claim 8, further comprising:
accessing a portion of audio data that is associated with the client profile; and
prior to transmitting a first message to the client, causing the voice interaction device to transmit the portion of audio data to the client.

12. The computer-implemented method of claim 8, further comprising:
generating a data packet that includes computer-executable instructions that automate the performance of the at least one action with respect to the client device based at least in part on an authentication of the identity of the client;
transmitting the data packet to the client device; and
transmitting a message, via the voice interaction device, indicating a performance of the at least one action.

13. The computer-implemented method of claim 12, further comprising:
determining that support data is required for the performance of the at least one action; and
transmitting, via the voice interaction device, a request for the client to provide the support data,
wherein automating the performance of the at least one action is further based at least in part on receipt of the support data.

14. The computer-implemented method of claim 8, wherein the incoming voice communication corresponds to a service support request for a client device, the client device configured to interact with the computing resource of a service provider, and the computer-implemented method further comprising
accessing a client account associated with the service provider, the client account including a client device type and a communication protocol of the client device; and
generating a data packet for execution on the client device, the data packet including computer-executable instructions that automate performance of a diagnostic check on the client device, based at least in part on the client device type,
wherein the at least one action corresponds to transmitting the data packet to the client device via the communication protocol.

15. The computer-implemented method of claim 14, further comprising:
receiving, from the client device, result data associated with the diagnostic check; and
generating an additional data packet for execution on the client device, based at least in part on result data, the additional data packet including computer-executable instructions that automatically adjust a product setting of the client device.

16. A voice control integration system, comprising:
one or more processors; and
memory coupled to the one or more processors, the memory storing one or more instructions that, if executed by the one or more processors, cause the one or more processors to perform operations comprising:
detecting, via a voice interaction device, an incoming voice communication from a client, the incoming voice communication including an implied request to perform at least one action that is associated with a computing resource;
parsing content of the incoming voice communication to identify the implied request to perform the at least one action;
identifying a client profile associated with the client based at least in part on the incoming voice communication, the client profile including a two-factor authentication protocol associated with the computing resource;
detecting a client device different from the voice interaction device;
determining a first authentication score based at least in part on an execution of a first factor of the two-factor authentication protocol at the client device;
transmitting, via the voice interaction device, a request for execution of a second factor of the two-factor authentication protocol;
determining a second authentication score based at least in part on the requested execution of the second factor of the two-factor authentication protocol at the voice interaction device; and
performing the at least one action that is associated with the incoming voice communication based at least in part on a combination of at least: (i) the first authentication score associated with the client device and (ii) the second authentication score associated with the voice interaction device, wherein:
the authentication protocol varies based on a particular type of access to a particular computing resources;
the second authentication score associated with the voice interaction device is based at least in part on a voice biometric; and
the first authentication score associated with the client device is independent of a voice biometric.

17. The voice control integration system of claim 16, wherein the instructions, if executed by the one or more processors, cause the one or more processors to perform operations further comprising:
generating a data packet for transmission to the client device, the data packet including computer-executable instructions that automate performance of the at least one action on the client in response at least in part to the authentication;
determining that support data is required for performance of the at least one action, the support data corresponding to diagnostic data associated with the client device; and
transmitting, via the voice interaction device, a request for the client to provide the support data,
wherein the generating of the data packet for transmission to the client device is based at least in part on receipt of the support data.

18. The voice control integration system of claim 16, wherein the instructions, if executed by the one or more processors, cause the one or more processors to perform operations further comprising:
determining that the incoming voice communication is associated with a service issue of the client device, wherein the at least one action corresponds to performance of a diagnostic check of the client device;
receiving, from the client device, result data associated with the diagnostic check; and
generating an additional data packet for execution on the client device, the additional data packet including computer-executable instructions that automatically adjust a product setting of the client device, based at least in part on the result data.

\* \* \* \* \*